Dec. 19, 1961   H. SINKO   3,013,843
VEHICLE SUSPENSION
Filed March 11, 1960   3 Sheets-Sheet 1

INVENTOR.
Henry Sinko
BY
G.E. McGlynn Jr.
ATTORNEY

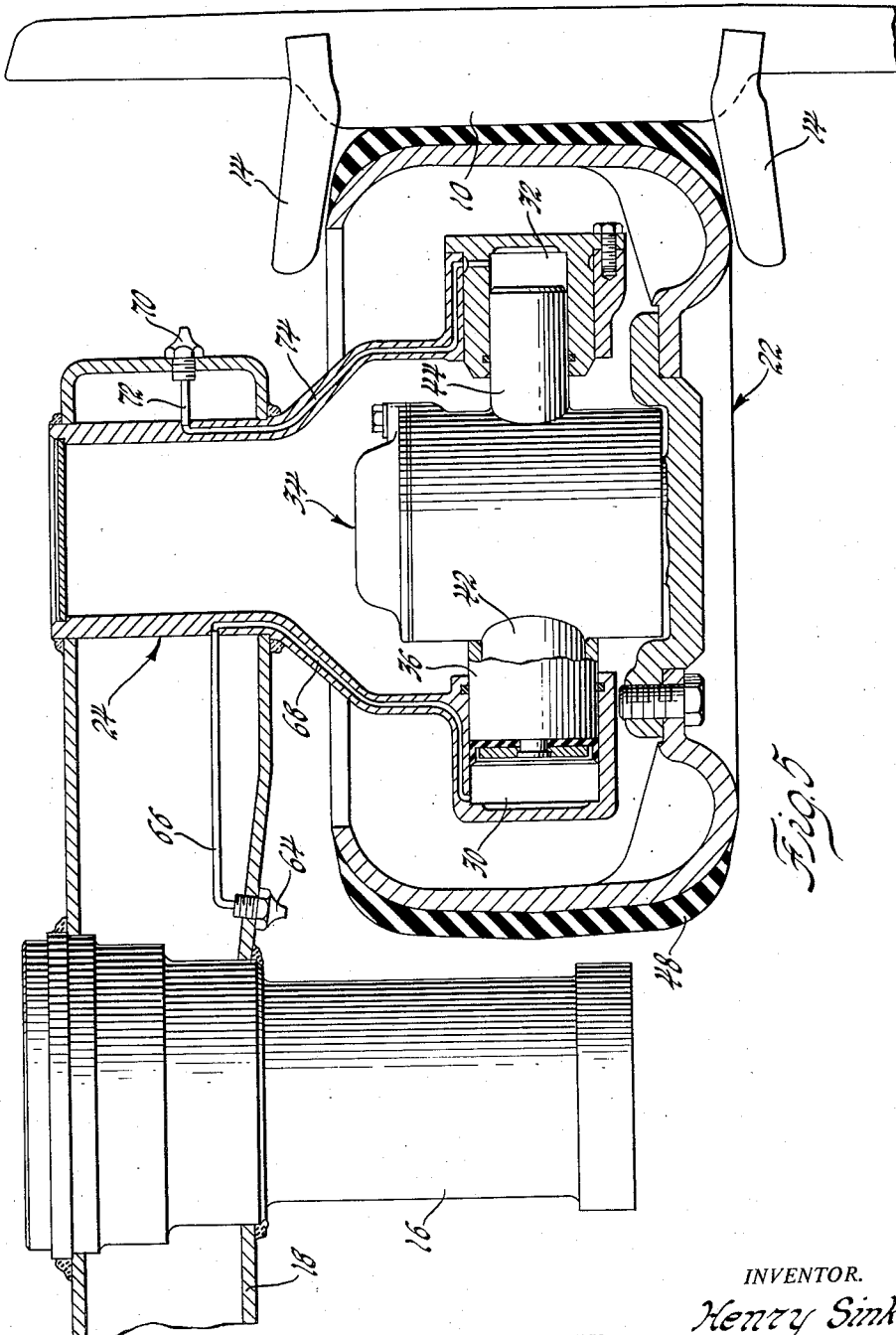

United States Patent Office 3,013,843
Patented Dec. 19, 1961

3,013,843
VEHICLE SUSPENSION
Henry Sinko, Bay Village, Ohio, assignor to General Motors Corporation, Detroit, Mich., a corporation of Delaware
Filed Mar. 11, 1960, Ser. No. 14,476
16 Claims. (Cl. 305—10)

This invention pertains to a suspension mechanism for a crawler or track-laying vehicle and, in particular, to such a suspension mechanism particularly designed and intended for military-type crawler vehicles.

Generally speaking, track-laying vehicles of the type to which the present invention relates typically comprise a drive or sprocket wheel, a plurality of support or road wheels and an idler wheel. An endless track of a suitable and desired type is entrained about the aforementioned wheels and drivingly supports the vehicle on the ground. The drive or sprocket wheel is located at one end of the vehicle and track, the idler wheel is located at the other end thereof and the road wheels disposed therebetween.

In such vehicles, a problem is presented with respect to maintaining a preselected and desired track tension particularly as track wear occurs. Additionally, in the instance where rocks or other objects become confined between one or more of the wheels and the track, severe stresses may occur resulting in excessive track wear or damage. Still another problem presented by such track-laying vehicles is that relating to the severe forces imposed upon the suspension assembly tending to cause the endless track to slip laterally from one or more of the vehicle wheels. This problem is particularly critical with respect to the idler wheel inasmuch as such forces tend to twist the track about the idler wheel causing the track to either slip entirely therefrom or to break.

In track-laying vehicles in general, mechanical devices for maintaining the endless tracks thereof under desired tension are well known in the prior art. In a typical installation, one or more heavy but yieldable coiled springs are utilized to urge the track idler wheel against a fixed stop to a position providing a desired track tension. The fixed stop is usually adjustable fore and aft to take up initial slack in the track linkage and to provide for periodic readjustment necessitated by gradual wear of the track links. When rocks or other obstructions become lodged between the tracks and idler wheel or drive sprocket, the idler wheel moves against the pressure of the yieldable coiled spring until the obstruction has been dislodged and thereupon returns in response to spring pressure until arrested by the fixed stop.

While this type of adjustable recoil mechanism is adequate under normal conditions of operation, numerous problems arise in connection therewith, among which is the difficulty encountered in making periodic adjustments to take up track slack resulting from normal wear of the track linkage. Under field conditions, accumulation of rust, dirt and ice, etc. often make it extremely difficult to reset the mechanical stops. Similarly, field disassembly of the mechanism presents considerable danger because of the high spring preload necessary to provide sufficient resistance to recoil. Moreover, the aforementioned typical track tensioning and adjusting mechanism is mounted wholly exteriorly of the wheel, such as the idler wheel, to be adjusted and tensioned against the track. Consequently, such recoil and adjusting mechanisms require additional space for mounting on the vehicle, and, being exposed, are susceptible to damage.

It is a principal object and feature of this invention to provide an improved suspension mechanism for a track-laying vehicle, and particularly for the idler wheel of the vehicle, and characterized by improved and simplified means for mounting the idler wheel in the suspension.

It is yet another object and feature of this invention to provide, in combination with an idler wheel suspension, a track tensioning mechanism which is wholly contained within the idler wheel assembly.

It is yet another object and feature of this invention to provide such a track tensioning mechanism for an idler wheel which will additionally operate in recoil to relieve objectionable stresses on the track due to foreign objects becoming lodged between the latter and the various wheels of the suspension.

It is yet another object and feature of this invention to provide such a track adjusting or track adjusting and recoil mechanism which will automatically permit idler wheel movement in response to twisting of the track entrained thereabout to reduce substantially, if not eliminate, the tendency of the track to slip from the idler wheel or break.

In general, these and other objects of this invention are attained in a suspension mechanism for the endless track of a track-laying vehicle comprising an idler wheel assembly including an idler wheel housing operatively connected to the vehicle and projecting laterally therefrom, a pair of spaced axially aligned and opposed chambers within the housing, an idler wheel spindle support including a pair of spaced axially aligned oppositely projecting piston means adapted to be respectively received or mounted within the aforesaid chambers for rotation and reciprocation relative thereto, an idler wheel substantially entirely surrounding the idler wheel housing and including a wheel spindle rotatably mounted within the spindle support, and means for selectively supplying a suitable fluid to one or the other or both of said chambers for adjusting track tension alone or adjusting track tension while additionally permitting idler wheel recoil.

A more complete understanding of the invention may be had by consideration of the accompanying drawings in which:

FIGURE 5 is a view corresponding generally to FIGURE 4, but showing another embodiment of the invention.

Figure 1:
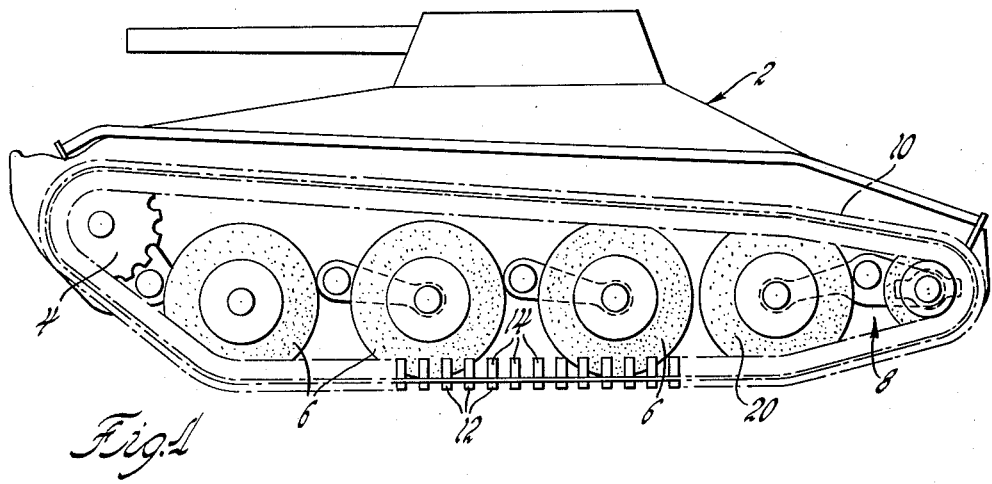
FIGURE 1 is a side elevation of a miiltary-type track-laying vehicle equipped with a preferred embodiment of the invention.

At this juncture, it should be noted that the present invention is particularly designed and adapted for use with the military-type vehicle depicted in FIGURE 1 of the drawings. However, as the description of the invention proceeds, it will become apparent that the invention may be used with other types of crawler vehicles such as those utilized in earth-moving operations.

Referring now to FIGURE 1 of the drawings, there is shown a military-type vehicle indicated generally at 2 having a plurality of longitudinally spaced drive, road or suspension and idler wheels at one side thereof, it being understood that this construction is duplicated on the other side thereof. More specifically, the aforementioned wheels include the forwardly located drive or sprocket wheel 4 which, it will be understood, is adapted to be driven from the power plant of the vehicle. There are also provided a suitable number of intermediate road or suspension wheel assemblies indicated at 6. A rear suspension and idler assembly 8 is located at the rear of the vehicle. The endless track 10 may be of any suitable and desired form, but is herein shown to comprise a plurality of circumferentially spaced track shoes 12 having cleats particularly designed for driving engagement with the ground, and a pair of laterally spaced generally upstanding and inwardly directed track guides 14 adapted to embrace various wheels of the vehicle suspension. It will be understood that drive transmitted from the sprocket 4 to the track 10 results in the latter traveling about the other wheels of the suspension thereby propelling the vehicle along the ground.

Figure 2:
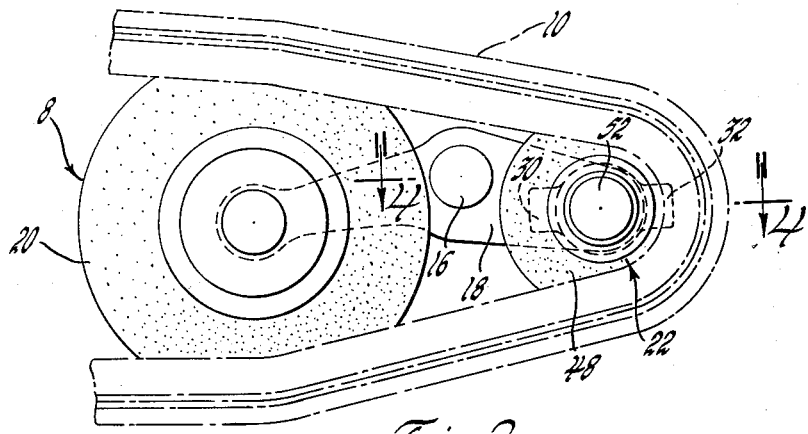
FIGURE 2 is an enlarged fragmentary view of FIGURE 1 showing the rear suspension system for the vehicle.
Figure 4:
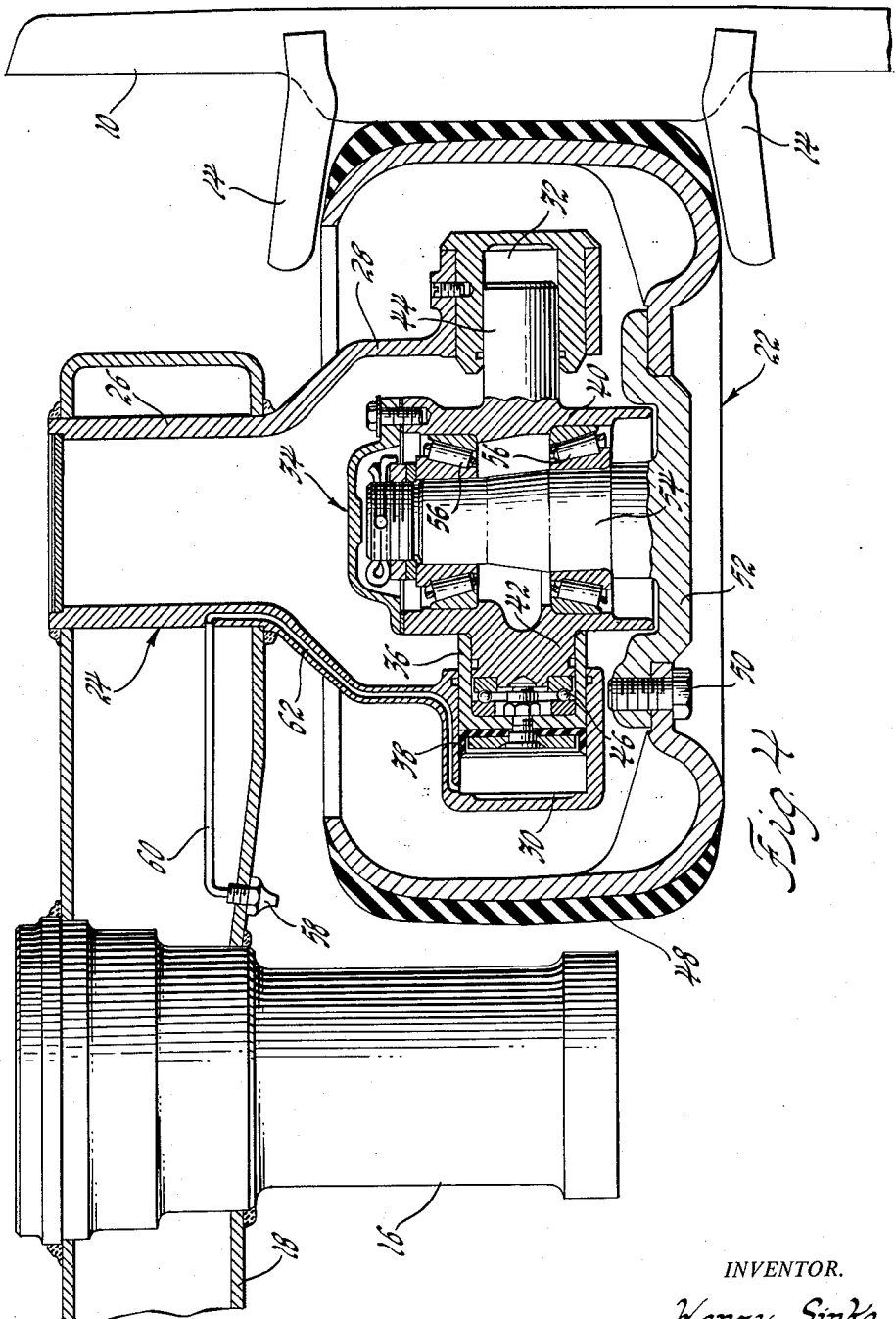
FIGURE 4 is an enlarged fragmentary view taken on line 4—4 of FIGURE 2.

Referring now additionally to FIGURES 2 and 4, the rear suspension mechanism 8 may be seen to comprise a relatively large hollow hub 16 to which there is rigidly secured a longitudinally extending suspension arm 18. As will be fully understood by those acquainted with the military vehicle suspension art, the hollow hub 16 is adapted to be rigidly clutched or secured coaxially to the outer end of a transversely extending torsion bar or shaft having its inner end rigidly secured to the frame of the vehicle. Therefore, the suspension arm 18 is permitted to oscillate about an axis extending transversely of the vehicle. A relatively large suspension or road wheel 20 is suitably rotatably supported at the forward end of the suspension arm 18, while the smaller idler wheel assembly 22 is mounted at the opposite end of the arm.

The idler wheel assembly 22 includes an idler wheel housing 24 having a cylindrical neck portion 26 rigidly secured to the rear end of the suspension arm 18, and an outer enlarged hollow portion 28 projecting laterally from the suspension arm. A pair of longitudinally spaced axially aligned and opposed open-ended chambers or cylinders 30 and 32 are formed within the housing portion 28. It will be noted from a consideration of the drawings that the common axis of these cylindrical chambers 30 and 32 is aligned on the common longitudinally extending horizontal axis of rotation of each of the road wheels 6 and 20.

An idler wheel spindle support is indicated generally at 34 and includes a cylindrical hollow or open-ended piston 36 reciprocably disposed within the cylindrical chamber 30, and provided with suitable seals or packing indicated at 38 to form a fluid-tight fit within the chamber 30. The idler wheel spindle support further includes a generally cylindrical hollow body member 40 from which there project in opposite directions the axially aligned cylindrical stub shafts or piston means 42 and 44. The shaft or piston member 42 is received within the piston member 36, while both members 36 and 42 are provided with axially opposed annular bearing races in which the ball bearing members 46 are seated. The other stub shaft or piston member 44 is seated within the cylindrical chamber 32. As a result of this construction, it may be seen that the spindle support 34 is rotatable or oscillatable relative to the housing 24 about the axis of the chambers 30 and 32 or piston means 42 and 44. Moreover, it will also be appreciated that the spindle support assembly is reciprocably disposed within the aforementioned chambers.

The idler wheel 48, covered with a suitable friction material for engagement with track 10 as is conventional practice, substantially entirely surrounds the housing portion 28, and is radially spaced with respect thereto. The wheel is adapted to be rigidly secured by means of a plurality of fasteners 50 to the idler wheel hub 52 formed integral with the idler wheel spindle 54. This spindle 54 is mounted rotatably within body member 40 of the support 34, there being a plurality of bearing means as indicated at 56 for this purpose.

Referring particularly to FIGURE 4, a grease fitting 58 is provided in a wall of the suspension arm 18 and is connected by a suitable conduit 60 to a passage 62 in the idler housing 24 communicating with the cylindrical chamber 30 and the piston member 36.

Figure 3:
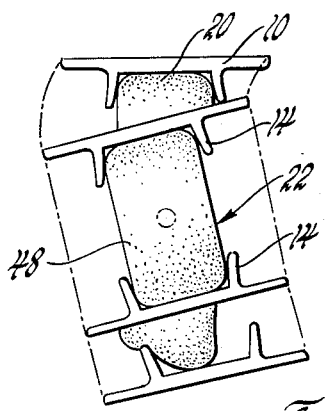
FIGURE 3 is a diagrammatic view corresponding generally to a view looking right to left in FIGURE 2.

In operation, it will be seen that the idler wheel 48 is supported for rotation relative to the support 34 by means of its spindle 54 and the bearings 56. Track tension may be adjusted merely by forcing grease into the cylindrical chamber 30 to cause the spindle support 34 to shift or reciprocate longitudinally or rearwardly in a direction substantially parallel to the vehicle axis. Moreover, and referring particularly to FIGURE 3, the rear idler wheel 48 is freely pivotable or oscillatable about the axis of the stub shafts or piston members 42 and 44 for the purpose of retaining the track guides 14 in correct position on the idler wheel when side thrusts are imposed upon the track causing twisting of the latter. In this regard, when the track section between the idler wheel 48 and road wheel 20 returns to its normal untwisted position, the idler will return to its normal position substantially in the same place as road wheel 20.

FIGURE 5 is directed to another embodiment of the invention which, in part, is identical to that previously described and, therefore, like numerals have been employed with respect to corresponding parts. In this embodiment of the invention, nitrogen or some other suitable compressible fluid may be selectively charged into the chamber 30 through the fitting 64 and the conduit 66 and passage 68 associated therewith. Another fitting 70 is provided in the suspension arm 18 and is connected through a suitable conduit 72 and a passageway 74 in the housing 24 to the cylindrical chamber 32 in which the stub shaft or piston means 44 is axially reciprocably mounted. A substantially incompressible fluid such as grease in adapted, therefore, to be charged into the chamber 32.

As a consequence, the fluid pressure in the chamber 30 acts to reciprocate the spindle or support housing 34 to place the idler wheel 48 in the preselected tensioning engagement with the track 10. This tension is limited by the fixed stop formed by the incompressible fluid in the chamber 32. Should track wear occur and it be desired to increase track tension, fluid need merely be bled from the chamber 32 thereby permitting further tensioning engagement between the idler wheel and track. If rocks or other foreign materials should become lodged between various wheels and the track, the idler wheel is permitted to act in recoil by means of the piston member 36 moving into the chamber 30 and compressing the fluid therein until such time as the obstacle passes. At that time, the fluid in the chamber 30, which is actually a self-contained accumulator, returns the idler wheel into proper track tensioning engagement.

While but two forms of the invention have been selected for a descriptive illustration thereof, other forms will be apparent to those skilled in the art. Therefore, the embodiments shown in the drawings are merely for illustrative purposes, and are not intended to limit the scope of the invention which is defined by the claims which follow.

I claim:
1. A suspension wheel assembly for the endless track of a track-laying vehicle comprising a suspension wheel support operatively connected to said vehicle, a pair of opposed axially aligned cylindrical chambers on said support, a suspension wheel, and means for mounting said wheel for rotation on said support including a pair of axially aligned and oppositely projecting stub shafts respectively received within said chambers for oscillation relative thereto about the axis thereof.

2. A suspension wheel assembly for the endless track of a track-laying vehicle comprising a suspension wheel housing operatively connected to said vehicle, a pair of opposed axially aligned cylindrical chambers within said housing, a suspension wheel spindle support including a pair of axially aligned and oppositely projecting stub shafts respectively received within said chambers for oscillation relative thereto about the axis thereof, and a suspension wheel including a wheel spindle rotatably mounted within said spindle support.

3. A suspension wheel assembly for the endless track of a track-laying vehicle comprising a suspension wheel housing operatively connected to said vehicle, a pair of opposed axially aligned cylindrical chambers within said housing, a suspension wheel spindle support including a pair of axially aligned and oppositely projecting stub shafts respectively received within said cylindrical chambers for oscillation relative thereto about the axis thereof, and a suspension wheel substantially surrounding said housing and including a wheel spindle rotatably mounted within said spindle support.

4. A suspension wheel assembly for the endless track of a track-laying vehicle comprising a suspension wheel support operatively connected to said vehicle, a pair of spaced chambers on said support, a suspension wheel, means for mounting said wheel for rotation on said support including a pair of oppositely projecting piston means respectively mounted within said chambers for reciprocation relative thereto, and means in one of said chambers to act upon its associated piston means whereby said wheel is reciprocated into tensioning engagement with said track.

5. A suspension wheel assembly for the endless track of a track-laying vehicle comprising a suspension wheel housing operatively connected to said vehicle, a pair of spaced chambers within said housing, a suspension wheel spindle support including a pair of oppositely projecting piston means respectively mounted within said chambers for reciprocation relative thereto, a suspension wheel including a wheel spindle rotatably mounted within said spindle support, and means in one of said chambers to act upon its associated piston means whereby said spindle support and wheel are reciprocated into tensioning engagement with said track.

6. A suspension wheel assembly for the endless track of a track-laying vehicle comprising a suspension wheel housing operatively connected to said vehicle, a pair of spaced chambers within said housing, a suspension wheel spindle support including a pair of oppositely projecting piston means respectively mounted within said chambers for reciprocation relative thereto, a suspension wheel substantially surrounding said wheel housing and including a wheel spindle rotatably mounted within said spindle support, and means for supplying fluid to one of said chambers to act upon its associated piston means whereby said spindle support and wheel are reciprocated into tensioning engagement with said track.

7. A suspension wheel assembly for the endless track of a track-laying vehicle comprising a suspension wheel housing operatively connected to said vehicle, a pair of opposed axially aligned cylindrical chambers within said housing, a suspension wheel spindle support including a pair of axially aligned and oppositely projecting cylindrical piston means respectively mounted within said chambers for oscillation and reciprocation relative thereto, a suspension wheel including a wheel spindle rotatably mounted within said spindle support, and means in one of said chambers to act upon its associated piston means whereby said wheel spindle support and said wheel are reciprocated into tensioning engagement with said track.

8. A suspension wheel assembly for the endless track of a track-laying vehicle comprising a suspension wheel housing operatively connected to said vehicle, a pair of opposed axially aligned cylindrical chambers within said housing, a suspension wheel spindle support including a pair of axially aligned and oppositely projecting cylindrical piston means respectively mounted within said chambers for oscillation and reciprocation relative thereto, a suspension wheel substantially surrounding said housing and including a wheel spindle rotatably mounted within said spindle support, and means for supplying fluid to one of said chambers to act upon its associated piston means whereby said wheel spindle support and said wheel are reciprocated into tensioning engagement with said track.

9. A suspension mechanism for the endless track of a track-laying vehicle comprising a longitudinally extending suspension arm at one side of said vehicle, a vehicle suspension wheel rotatably mounted at one end of said arm, an idler wheel assembly at the other end of said arm; said idler wheel assembly comprising an idler wheel housing rigidly secured to said arm and projecting laterally therefrom, a pair of opposed axially aligned cylindrical chambers within said housing, an idler wheel spindle support including a pair of oppositely projecting cylindrical piston means respectively mounted within said chambers for oscillation and reciprocation relative thereto, an idler wheel including a wheel spindle rotatably mounted within said spindle support, and means in one of said chambers to act upon its associated piston means whereby said idler wheel is reciprocated into tensioning engagement with said track.

10. A suspension mechanism for the endless track of a track-laying vehicle comprising a longitudinally extending suspension arm at one side of said vehicle, a vehicle suspension wheel rotatably mounted at one end of said arm, an idler wheel assembly at the other end of said arm; said idler wheel assembly comprising an idler wheel housing rigidly secured to said arm and projecting laterally therefrom, a pair of opposed axially aligned cylindrical chambers within said housing, the axis of said chambers being substantially coincident with a horizontal longitudinally extending axis through the axis of rotation of said suspension wheel, an idler wheel spindle support including a pair of oppositely projecting cylindrical piston means respectively mounted within said chambers for oscillation and reciprocation relative thereto, an idler wheel including a wheel spindle rotatably mounted within said spindle support, and means in one of said chambers to act upon its associated piston means whereby said idler wheel is reciprocated into tensioning engagement with said track.

11. A suspension mechanism for the endless track of a track-laying vehicle comprising a longitudinally extending suspension arm at one side of said vehicle, a vehicle suspension wheel rotatably mounted at one end of said arm, an idler wheel assembly at the other end of said arm; said idler wheel assembly comprising an idler wheel housing rigidly secured to said arm and projecting laterally therefrom, a pair of opposed axially aligned cylindrical chambers within said housing, the axis of said chambers being substantially coincident with a horizontal longitudinally extending axis through the axis of rotation of said suspension wheel, a hollow cylindrical piston reciprocably disposed in one of said cylindrical chambers, an idler wheel spindle support including a pair of axially aligned and oppositely projecting cylindrical stub shafts, said stub shafts being respectively mounted within said hollow piston and the other of said chambers, bearing means interposed between said hollow piston and its associated stub shaft whereby said spindle support is rotatable about the axis of said chambers, an idler wheel including a wheel spindle rotatably mounted within said spindle support, and means in said one chamber acting upon said hollow piston whereby said spindle support may be reciprocated relative to said housing to urge said idler wheel into tensioning engagement with said track.

12. A suspension wheel assembly for the endless track of a track-laying vehicle comprising a suspension wheel housing operatively connected to said vehicle, a pair of spaced chambers within said housing, a suspension wheel spindle support including a pair of oppositely projecting piston means respectively mounted within said chambers for reciprocation relative thereto, a suspension wheel including a wheel spindle rotatably mounted within said spindle support, yieldable means in one of said chambers to act upon its associated piston means whereby said spindle support and wheel are reciprocated into tensioning engagement with said track, said means being yieldable during recoil of said wheel, and means for supplying a substantially incompressible fluid to the other of said chambers to form a stop limiting tensioning engagement of said wheel with said track.

13. A suspension mechanism for the endless track of a track-laying vehicle comprising an idler wheel assembly operatively connected to said vehicle, said assembly comprising an idler wheel housing projecting laterally from said vehicle, a pair of opposed axially aligned cylindrical chambers within said housing, an idler wheel spindle support including a pair of oppositely projecting cylindrical piston means respectively mounted within said chambers for oscillation and reciprocation relative thereto, an idler wheel substantially surrounding said idler wheel housing and including a wheel spindle rotatably mounted within said spindle support, means for supplying a compressible fluid to one of said chambers to act upon its associated piston means whereby said spindle support and idler wheel are reciprocated into tensioning engagement with said track, said compressible fluid being yieldable during recoil of said idler wheel, and means for supplying a substantially incompressible fluid to the other of said cylindrical chambers to form a stop limiting tensioning engagement of said idler wheel with said track.

14. A suspension mechanism for the endless track of a track-laying vehicle comprising a longitudinally extending suspension arm at one side of said vehicle, a vehicle suspension wheel rotatably mounted at one end of said arm, an idler wheel assembly at the other end of said arm; said idler wheel assembly comprising an idler wheel housing rigidly secured to said arm and projecting laterally therefrom, a pair of opposed axially aligned cylindrical chambers within said housing, the axis of said chambers being substantially coincident with a horizontal longitudinally extending axis through the axis of rotation of said suspension wheel, a hollow cylindrical piston reciprocably disposed in one of said cylindrical chambers, an idler wheel spindle support including a pair of axially aligned and oppositely projecting cylindrical stub shafts, said stub shafts being respectively mounted within said hollow piston and the other of said chambers, bearing means interposed between said hollow piston and its associated stub shaft whereby said spindle support is oscillatable about the axis of said chambers, an idler wheel substantially surrounding said idler wheel housing and including a wheel spindle rotatably mounted within said spindle support, means for supplying a compressible fluid to said one chamber to act upon said hollow piston whereby said spindle support is reciprocated relative to said chambers to urge said idler wheel into tensioning engagement with said track, said compressible fluid being yieldable during recoil of said idler wheel, and means for supplying a substantially incompressible fluid to the other of said chambers to form a fixed stop for its associated stub shaft to limit track tensioning engagement of said idler wheel with said track.

15. A suspension wheel assembly for the endless track of a track-laying vehicle comprising a suspension wheel housing operatively connected to said vehicle, a suspension wheel spindle support, means mounting said spindle support on said housing for oscillation therebetween about a first axis, a suspension wheel substantially surrounding said housing and including a spindle fixed relative thereto, and means rotatably supporting said spindle on said spindle support on a second axis perpendicular to and intersecting said first axis.

16. A suspension wheel assembly for the endless track of a track-laying vehicle comprising a suspension wheel housing operatively connected to said vehicle, a suspension wheel spindle support, means mounting said spindle support on said housing for oscillation therebetween about a first axis, a hollow suspension wheel open at one end and having a hub fixed to the other end thereof, a spindle rigidly secured to said hub and projecting internally of said wheel, and means rotatably supporting said spindle on said spindle support on a second axis perpendicular to and intersecting said first axis whereby said wheel substantially surrounds said housing.

References Cited in the file of this patent

UNITED STATES PATENTS

| | | |
|---|---|---|
| 2,343,301 | Knox | Mar. 7, 1944 |
| 2,837,379 | Selyem | June 3, 1958 |
| 2,843,431 | Beaufort | July 15, 1958 |
| 2,902,289 | North | Sept. 1, 1959 |

FOREIGN PATENTS

| | | |
|---|---|---|
| 911,354 | Germany | May 13, 1954 |